（12）United States Patent
Oliver

（10）Patent No.: US 10,593,120 B1
（45）Date of Patent: Mar. 17, 2020

(54) AUGMENTED REALITY VIEWING OF PRINTER IMAGE PROCESSING STAGES

(71) Applicant: KYOCERA Document Solutions Inc., Osaka (JP)

(72) Inventor: Don Oliver, Simi Valley, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/115,212

(22) Filed: Aug. 28, 2018

(51) Int. Cl.
*G06T 19/00* (2011.01)
*G06F 3/12* (2006.01)

(52) U.S. Cl.
CPC .......... *G06T 19/006* (2013.01); *G06F 3/1207* (2013.01); *G06F 3/1259* (2013.01); *G06F 3/1292* (2013.01)

(58) Field of Classification Search
None
See application file for complete search history.

(56) References Cited

U.S. PATENT DOCUMENTS

| 9,245,237 | B2* | 1/2016 | Hamilton, II | G06Q 10/00 |
| 10,303,350 | B2* | 5/2019 | Jiang | G06F 3/04845 |
| 2010/0332980 | A1* | 12/2010 | Sun | G06F 3/04815 |
| | | | | 715/706 |
| 2011/0066928 | A1* | 3/2011 | Karlsson | G06F 16/4393 |
| | | | | 715/202 |
| 2012/0249741 | A1* | 10/2012 | Maciocci | G06F 3/011 |
| | | | | 348/46 |
| 2015/0123966 | A1* | 5/2015 | Newman | G06T 19/006 |
| | | | | 345/419 |
| 2016/0217617 | A1* | 7/2016 | Barribeau | G06F 3/04815 |
| 2017/0287218 | A1* | 10/2017 | Nuernberger | G06T 19/006 |
| 2018/0081519 | A1* | 3/2018 | Kim | G06F 3/04815 |
| 2018/0341435 | A1* | 11/2018 | Matsuyama | G06F 3/1204 |

OTHER PUBLICATIONS

Guimbretiére, François. "Paper augmented digital documents." Proceedings of the 16th annual ACM symposium on User interface software and technology. ACM, 2003. (Year: 2003).*

\* cited by examiner

*Primary Examiner* — Ryan M Gray
(74) *Attorney, Agent, or Firm* — Rowan TELS LLC

(57) ABSTRACT

A method of generating an Augmented Reality (AR) display environment includes establishing a data connection at a mobile device to a printer image processing pipeline and generating an augmentation object of a virtual image based on the received printer image. Live video data of the physical environment is received from an imaging sensor on the mobile device, and a local 3D model of the physical environment utilizing the live video data is generated. Device tracking data from the mobile device is used to adapt the local 3D model. The augmentation object is combined with the adapted local 3D model to create an AR display environment, followed by configuring the mobile device to display the AR display environment. A mobile device includes a processor and memory with instructions to configure the device to generate an AR display environment.

18 Claims, 13 Drawing Sheets

US 10,593,120 B1

AUGMENTED REALITY VIEWING OF PRINTER IMAGE PROCESSING STAGES

BACKGROUND

After submitting a document or image to a printer, a user may want to preview the document or image before the actual printing process begins. A developer of printer firmware and image-processing software typically modifies the software code of the printer to export images from various stages in the image processing pipeline into data files that are transferred to a PC running some kind of viewer application. At this point, a user may pan and zoom to inspect the details of the image using a mouse. In addition to requiring a computer and an additional viewing program, the user views the document on a screen, which is an artificial environment compared to a physically printed document. Thus, what is needed is a way of previewing in real time, an image sent to a printer as it will be seen in a real physical space.

BRIEF SUMMARY

The present disclosure includes a method of generating an Augmented Reality (AR) display environment including establishing a data connection at a mobile device, wherein the data connection connects to a printer image processing pipeline comprising printer image data, and the mobile device comprises an imaging sensor and a display. The printer image data is received on the mobile device from the printer image processing pipeline and an augmentation object of a virtual image is generated based on the received printer image data, wherein the augmentation object includes virtual image data that describes the virtual image. Next, live video data of a physical environment is received from the imaging sensor on the mobile device, wherein the physical environment includes physical objects with detectable features, and content of the live video data collected by the imaging sensor is at least partially directed by a user input. A local 3D model of the physical environment is generated utilizing the live video data followed by receiving mobile device tracking data from the mobile device. The local 3D model is adapted based on the mobile device tracking data, thereby creating an adapted local 3D model, which is combined with the augmentation object to create an AR environment. Next, the mobile device is configured to display the AR environment.

In another embodiment, a mobile device includes a processor, an imaging sensor, a display, and a memory storing instructions that, when executed by the processor, configure the mobile device to establish a data connection at the mobile device, wherein the data connection connects to a printer image processing pipeline comprising printer image data. The printer image data is received on the mobile device from the printer image processing pipeline and an augmentation object of a virtual image is generated based on the received printer image data, wherein the augmentation object includes virtual image data that describes the virtual image. Live video data of a physical environment is received from the imaging sensor on the mobile device, wherein the physical environment includes physical objects with detectable features, and content of the live video data collected by the imaging sensor is at least partially directed by a user input. A local 3D model of the physical environment is generated utilizing the live video data. Next, mobile device tracking data is received from the mobile device, and the local 3D model is adapted based on the mobile device tracking data, thereby creating an adapted local 3D model. The augmentation object is combined with the adapted local 3D model to create an AR environment, and the mobile device is configured to display the AR environment.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

Figure 1:
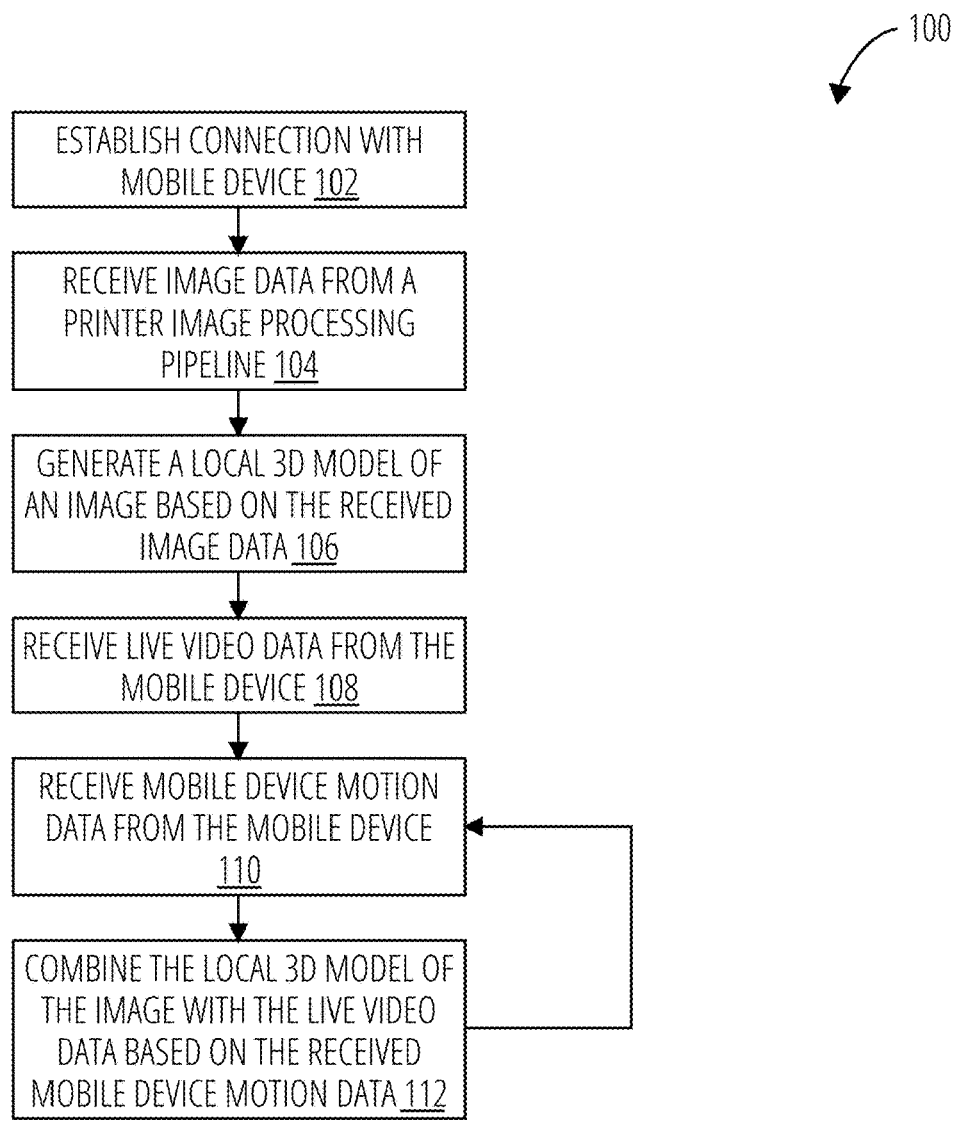
FIG. 1 illustrates a method 100 in accordance with one embodiment.

"Virtualize" in this context refers to converting a physical thing to a computer-generated simulation of that thing.

"Augmented reality" in this context refers to technology that superimposes computer-generated imagery on a user's view of the real world, thus providing a composite view.

"Virtual reality" in this context refers to the computer-generated simulation of a three-dimensional environment that can be interacted with in a seemingly real or physical way by a person using special electronic equipment, such as a headset with a display and gloves fitted with sensors.

"Pipeline" in this context refers to a set of data processing elements connected in series, where the output of one element is the input of the next one. The elements of a pipeline are often executed in parallel or in time-sliced fashion; in that case, some amount of buffer storage is often inserted between elements.

"Printer image data" in this context refers to raster data, also known as binary image data that may be used to produce a bitmap, which may be used to store a binary image. Typically, a raster image processor is used to convert PDLs (Page Description Languages) into raw binary dot patterns that form a binary image where each pixel is, for example, either black or white.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

DESCRIPTION

In an embodiment, a software application ("app") on a user's mobile device establishes a data communication connection to the software running in a printing device. The mobile device app retrieves data from the printer software that represents images in the various stages of image processing of a print job in the printer image processing pipeline. The mobile device software application tracks the real position and orientation of the mobile device in three physical spatial dimensions of a physical space using feature information extracted from a video stream from the mobile device's internal video camera as the user directs the mobile device's camera toward an object in the physical environment, e.g. the surface of a table or wall. The mobile device software app displays the live video stream from the camera, overlaid with images from the printer, such overlaid images appearing to the user to be superimposed on the live video stream in three-dimensional space. As the user moves the mobile device through the physical space the app translates these motions to pan across the virtual surface of the virtual images, maintaining relative size constancy and visual perspective. As the user moves the mobile device closer and further back from the physical object (e.g., table or wall) in a view of the camera, the app increases or decreases the magnification of the virtual image (zooming).

Referring to FIG. 1, a method 100 comprises establishing a connection with a mobile device (block 102), receiving image data from a printer image processing pipeline (block 104), generating a local 3D model of an image based on the received image data (block 106), receiving live video data from the mobile device (block 108), receiving mobile device motion data from the mobile device (block 110), and combining the local 3D model of the image with the live video data based on the received mobile device motion data (block 112). As the mobile device motion data changes, the local 3D model of the image that is displayed with the live video data is updated.

Figure 2:
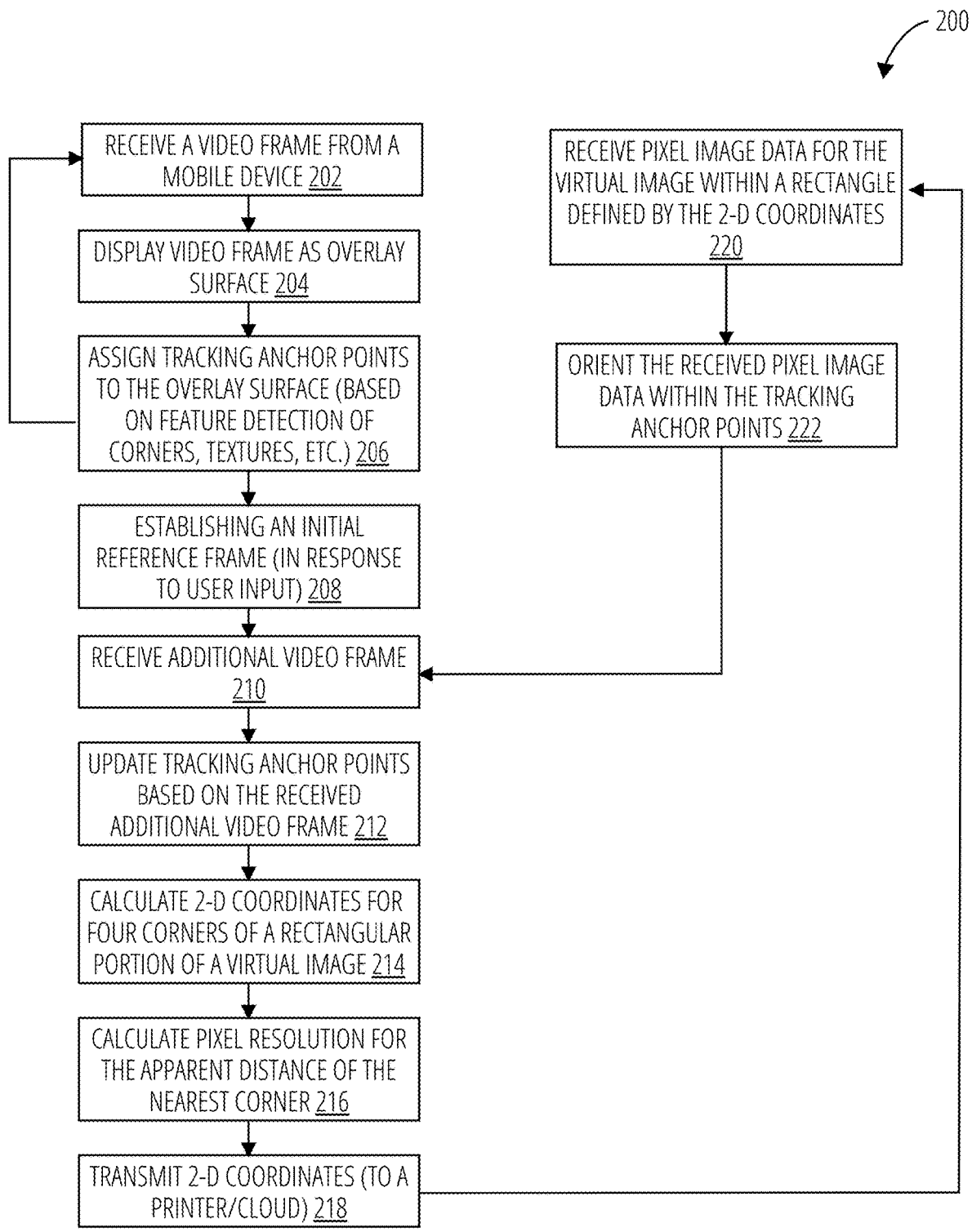
FIG. 2 illustrates a method 200 in accordance with one embodiment.

Referring to FIG. 2, a method 200 comprises receiving a video frame from a mobile device (block 202), displaying the video frame as an overlay surface (block 204), assigning tracking anchor points to the overlay surface based on feature detection (block 206), establishing an initial reference frame in response to user input (block 208), receiving an additional video frame from the mobile device (block 210), updating tracking anchor points based on the received additional video frame (block 212), calculating 2-D coordinates for four corners of a rectangular portion of a virtual image (block 214), calculating pixel resolution for the apparent distance of the nearest corner (block 216), transmitting 2-D coordinates to a printer or cloud (block 218), receiving pixel image data for the virtual image within a rectangle defined by the 2-D coordinates (block 220), and orienting the received pixel image data within the tracking anchor points (block 222). Pixel image data may represent a subset of printer image data, and is based on the calculated pixel resolution in block 216. Pixel image data contains data, from the printer image data, for the virtual image within the rectangle defined by the 2-D coordinates in block 220. If the full virtual image is within the rectangle, then pixel image data may be equivalent to printer image data, i.e., all of the printer image data is contained in the pixel image data. As the position of the mobile device changes relative to the overlay surface, the video frame as an overlay surface is modified.

In an embodiment, a method of generating an Augmented Reality (AR) display environment includes: establishing a data connection at a mobile device. The data connection may connect to a printer image processing pipeline that includes printer image data. The mobile device may include an imaging sensor and a display. The printer image data may be received on the mobile device from the printer image processing pipeline. Next, an augmentation object of a virtual image based on the received printer image data may be generated. Also, live video data of the physical environment from an imaging sensor on the mobile device may be received. The physical environment may include physical objects with detectable features, and the content of the live video data collected by the imaging sensor may be at least partially directed by a user input. A local 3D model of the physical environment utilizing the live video data may be generated using local modeling logic, in addition to receiving mobile device tracking data from the mobile device. The live video data may provide the location of the physical objects with detectable features, which may be used to construct the local 3D model. The local 3D model may be adapted based on the mobile device tracking data, thereby creating an adapted local 3D model. The augmentation object may be combined with the adapted local 3D model to create an AR environment, followed by configuring the mobile device to display the AR environment.

In an embodiment, the mobile device is at least one of a mobile phone, a tablet, an AR headset, and combinations thereof.

In an embodiment, the printer image data may comprise pixels. The augmentation object may comprise at least one of: location data defining a desired location in 3D space of the virtual image, structural data defining the 3D surface structure of the virtual image, image data defining the 2D surface texture of the virtual image to be applied to the surfaces defined by the local 3D model, and combinations thereof.

In an embodiment, the tracking data may include data from at least one of a camera, an accelerometer, a compass, a proximity sensor, a motion sensor, RF receivers, a light sensor, a positioning system, and combinations thereof.

In an embodiment, the user input includes at least one of directing the imaging sensor to a portion of the physical environment, moving the imaging sensor closer to or further from the physical objects in the physical environment, selecting a portion of the virtual image data in the AR environment to display, and combinations thereof.

In an embodiment, the generating of an augmentation object of a virtual image based on the received printer image data may include: calculating 2D coordinates for the four corners of the virtual image, wherein the virtual image is rectangular in shape and includes four corners. The calculating of the 2D coordinates may include determining the distance between each corner of the virtual image to an adjacent corner of the virtual image, wherein the distance is the visible dimension in pixels of the display of the mobile device used to display the virtual image; calculating apparent 2D coordinates of each corner of the virtual image, wherein the apparent 2D coordinates are percentages relative to the longest visible dimension of the virtual image in the AR environment on the display; and calculating a pixel resolution from the apparent 2D coordinates, wherein the pixel resolution includes the apparent 2D coordinates of each corner of the virtual image.

In an embodiment, the method may further include: selecting a rectangular part of the virtual image, wherein the rectangular part is determined by the user input; and calculating 2D coordinates for the four corners of the rectangular part of the virtual image. The calculating 2D coordinates may include: determining the distance between each corner of the rectangular part of the virtual image to an adjacent corner of the full virtual image, wherein the distance is the visible dimension in pixels of the display of the mobile device used to display the virtual image; calculating apparent 2D coordinates of each corner of the rectangular part of the virtual image, wherein the apparent 2D coordinates of the rectangular part are percentages relative to the longest visible dimension of the full virtual image in the AR environment on the display; and calculating a pixel resolution for the rectangular part of the virtual image from the apparent 2D coordinates for the rectangular part, wherein the pixel resolution for the rectangular part includes the apparent 2D coordinates of each corner of the rectangular part of the virtual image.

In an embodiment, the method may further include: transmitting the pixel resolution to the printer image processing pipeline; receiving pixel image data for the pixel resolution from the printer image processing pipeline; generating a modified augmentation object of the virtual image based on the received pixel image data from the printer image processing pipeline; combining the modified augmentation object with the adapted local 3D model to create an updated AR environment; and configuring the mobile device to display the updated AR environment.

In an embodiment, the printer image processing pipeline includes a cloud server and the cloud server may perform at least one of the following: receiving image data from the printer image processing pipeline, transmitting image data from the printer image processing pipeline, generating a local 3D model of the physical environment, receiving mobile device tracking data from the mobile device; adapting the local 3D model based on the mobile device tracking data, thereby creating an adapted local 3D model, combining the augmentation object with the adapted local 3D model to create an AR environment, configuring the mobile device to display the AR environment, and combinations thereof.

Figure 3:
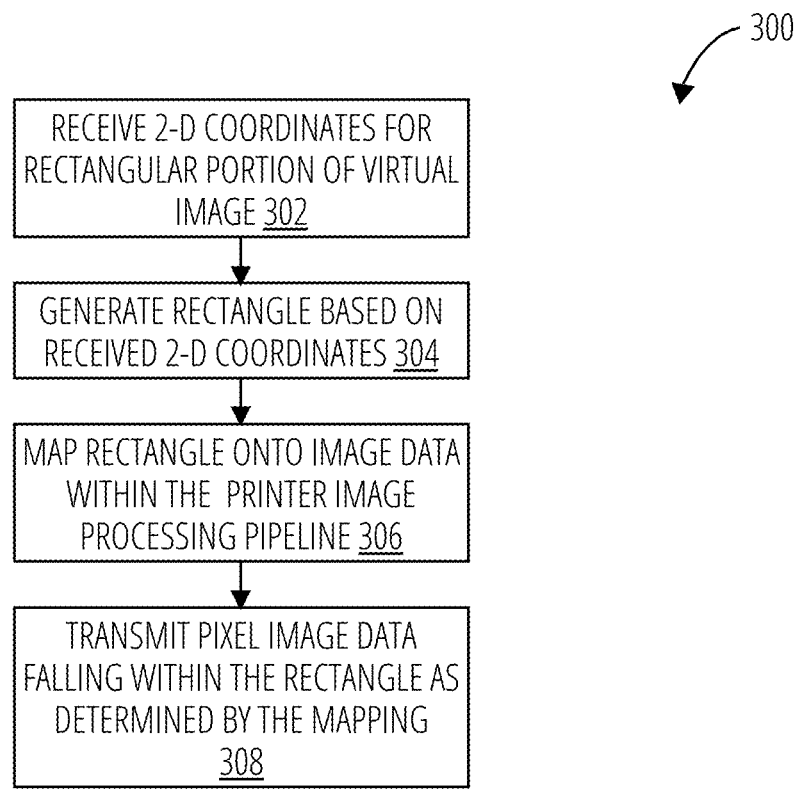
FIG. 3 illustrates a method 300 in accordance with one embodiment.

Referring to FIG. 3, the method 300 may include receiving 2-D coordinates for a rectangular portion of a virtual image (block 302), generating a rectangle based on the received 2-D coordinates (block 304), mapping the rectangle onto image data within the printer image processing pipeline (block 306), and transmitting pixel image data falling within the rectangle as determined by the mapping (block 308). The rectangular portion may be the entire virtual image, or just a small part of the image. In an embodiment, the portion of the virtual image includes at least one corner of the virtual image. The generation of the rectangle based on the received 2D coordinates may include determining the pixel resolution, where the pixel resolution includes the apparent 2D coordinates of each corner of the virtual image. In an embodiment, the printer image processing pipeline may include a cloud server.

Figure 4:
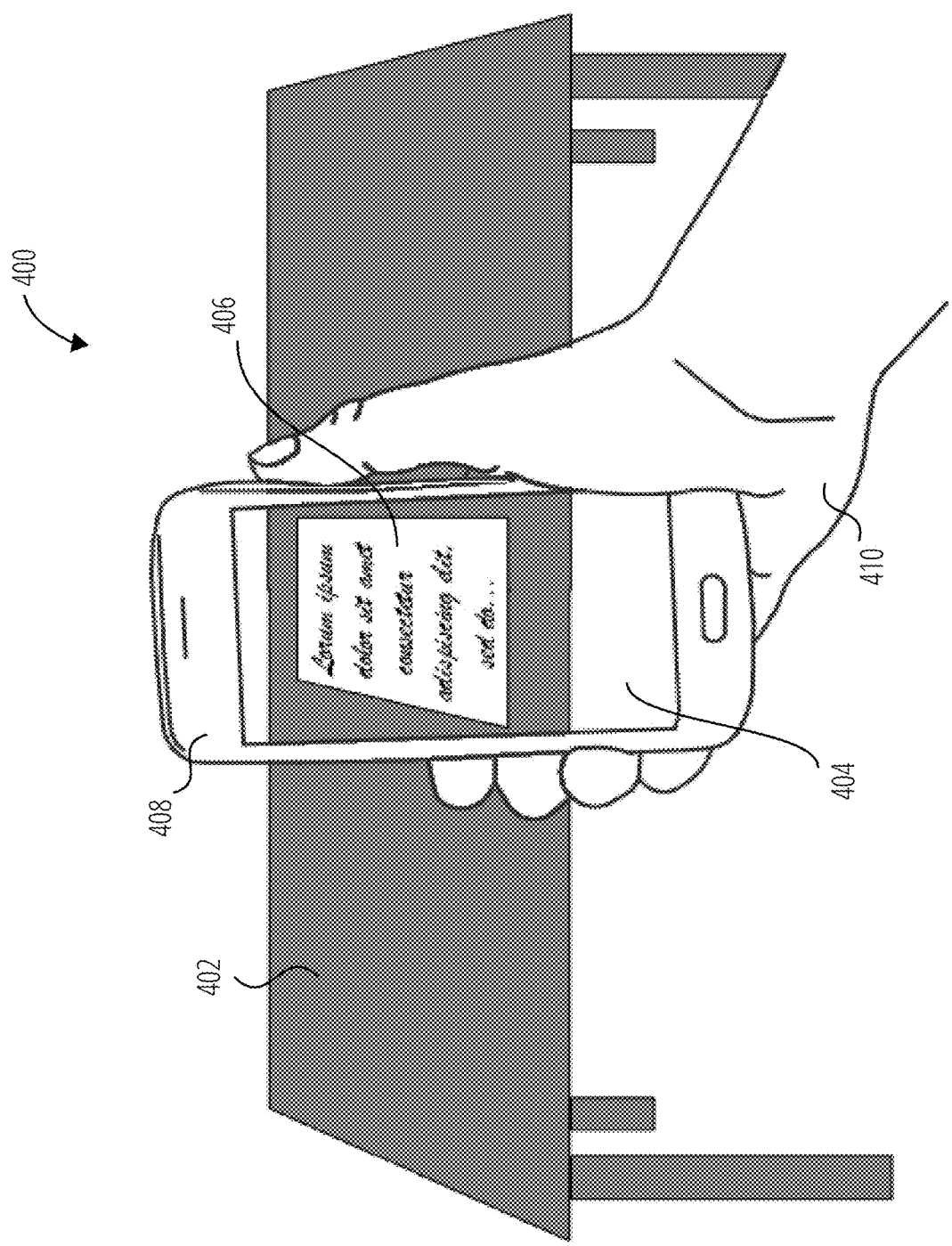
FIG. 4 illustrates an AR environment 400 in accordance with one embodiment.

As displayed in FIG. 4, an AR environment 400 may include a physical environment 402, an AR environment 404, a virtual environment 406, and a mobile device 408 held by a user 410. A table may represent the physical environment 402, a display on a mobile device 408 may display the AR environment 404, which may include a virtual environment 406 represented by a document in this embodiment. If a user 410 moves the mobile device 408 closer to the table, the document appears to be larger on the display (magnified), thus creating a zoomed-in effect as demonstrated in FIG. 5. As the mobile device 408 is moved away from the table, the document appears to be smaller and more of the document is displayed, thus creating a zoomed-out effect, which in this case is represented by FIG. 4.

Figure 5:
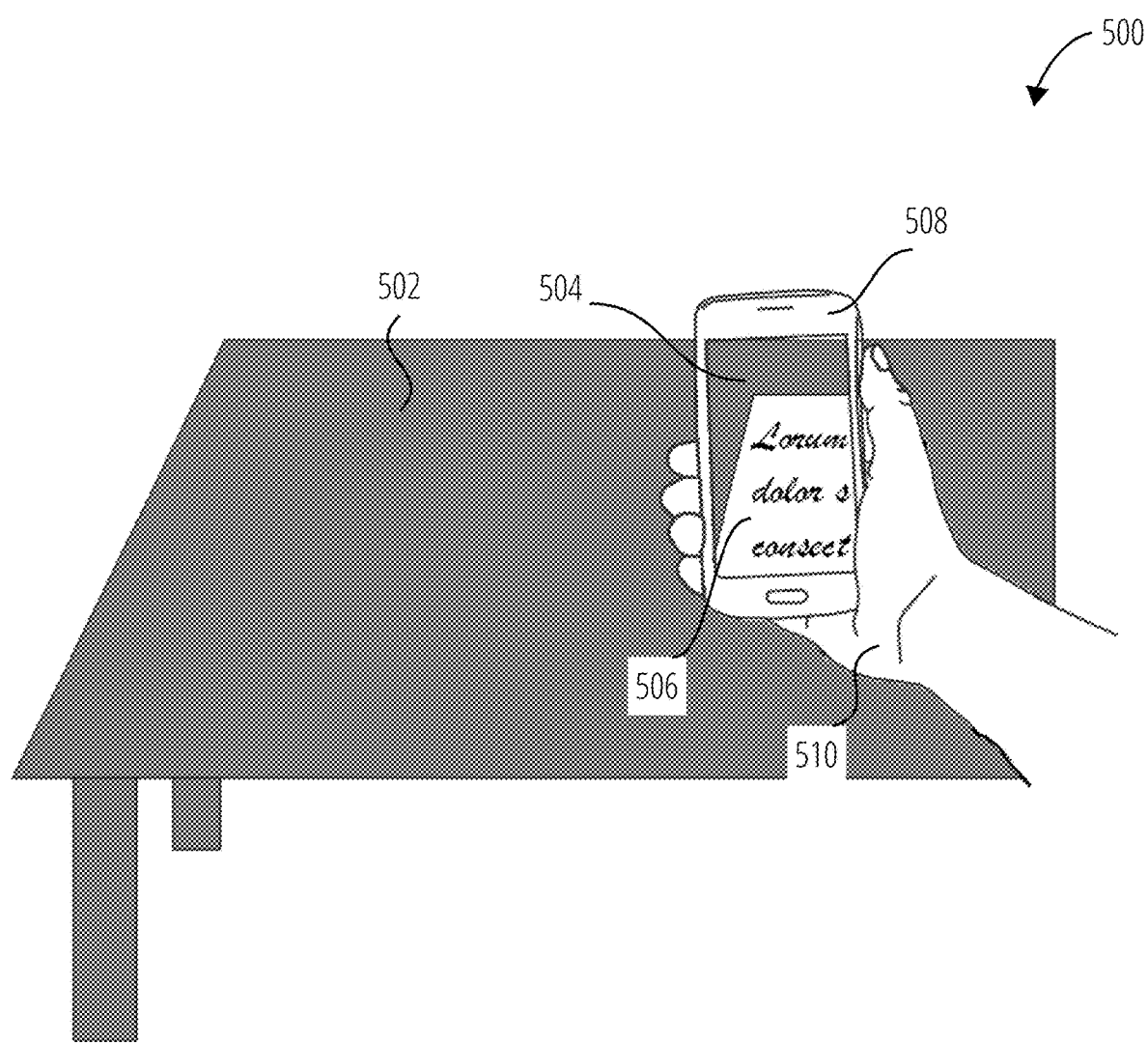
FIG. 5 illustrates a zoomed in AR environment 500 in accordance with one embodiment.

As displayed in FIG. 5, a zoomed in AR environment 500 may include a physical environment 502, an AR environment 504, a virtual environment 506, a mobile device 508, and a user 510. A table may represent the physical environment 502 and a display on a mobile device 508 may display the AR environment 504, which may include a virtual environment 506 represented by a document in this embodiment. As a user 510 moves the mobile device 508 closer to the table, the document appears to be larger on the display (magnified), thus creating a zoomed-in effect. If the mobile device 508 is moved away from the table, the document appears to be smaller, thus creating a zoomed-out effect similar to the virtual environment 406 in FIG. 4.

Figure 6:
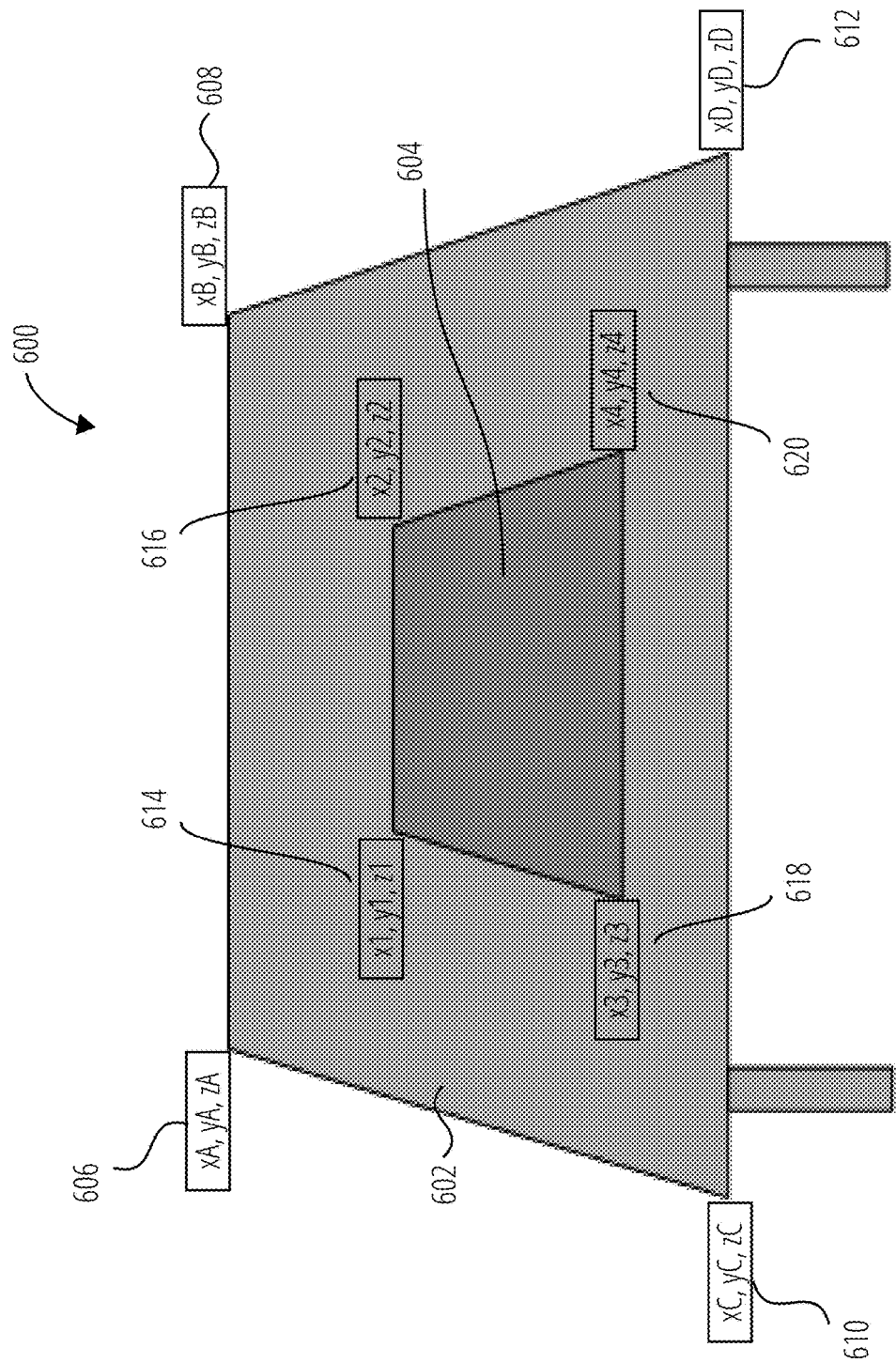
FIG. 6 illustrates a method of full virtual image generation 600 in accordance with one embodiment.

Referring to FIG. 6, a method of full virtual image generation 600 comprises a local 3D model 602, a virtual image 604, an upper left corner of the local 3D model 606, an upper right corner of the local 3D model 608, a lower left corner of the local 3D model 610, a lower right corner of the local 3D model 612, an upper left corner of virtual image 614, an upper right corner of virtual image 616, a lower left corner of virtual image 618, and a lower right corner of virtual image 620.

For full virtual image generation, the tracking of 3D coordinates at corners of a table (local 3D model 602) in a video image frame that may be captured by a camera on a mobile device and displayed on the mobile device may be denoted by the following points:

(xA,yA,zA) (upper left corner of the local 3D model 606)
(xB,yB,zB) (upper right corner of the local 3D model 608)
(xC,yC,zC) (lower left corner of the local 3D model 610)

(xD,yD,zD) (lower right corner of the local 3D model 612)

The virtual image 604 overlay 3-space coordinates may be denoted by the following points:
- (x1,y1,z1) (upper left corner of virtual image 614) ("point 1")
- (x2,y2,z2) (upper right corner of virtual image 616) ("point 2")
- (x3,y3,z3) (lower left corner of virtual image 618) ("point 3")
- (x4,y4,z4) (lower right corner of virtual image 620) ("point 4")

The information passed to the printer through the printer image processing pipeline may be in the form of percentages, so that the mobile app does not need to know the actual dimensions or resolution of the image in the printer. Because all points of the virtual image overlay are visible at this zoom level and orientation as shown in FIG. 6, the coordinates passed to the printer will be:
- Upper Left: 0%, 0%
- Upper right: 100%, 0%
- Lower Left: 0%, 100%
- Lower right: 100%, 100%

The resolution request passed to the printer will be the length (in pixels of the mobile device display) of the longest visible dimension of the virtual image overlay, which in this embodiment is the line segment between points 1 and 3 or between points 2 and 4.

The method of partial virtual image generation 700 comprises a partial local 3D model 702, a partial virtual image 704, an upper left corner of partial local 3D model 706, a lower left corner of partial local 3D model 708, an upper left corner of partial virtual image 710, and a lower left corner of partial virtual image 712.

For partial virtual image generation, the tracking of 3D coordinates at corners of a table (partial local 3D model 702) in a video image frame that may be captured by a camera on a mobile device and displayed on the mobile device may be denoted by the following points:
- (xA,yA,zA) (upper left corner of partial local 3D model 706)
- (xC,yC,zC) (lower left corner of partial local 3D model 708)

The partial virtual image 704 overlay 3D coordinates may be denoted by the following points:
- (x1,y1,z1) (upper left corner of partial virtual image 710) ("point 1a")
- (x3,y3,z3) (lower left corner of partial virtual image 712) ("point 3a")

Figure 7:
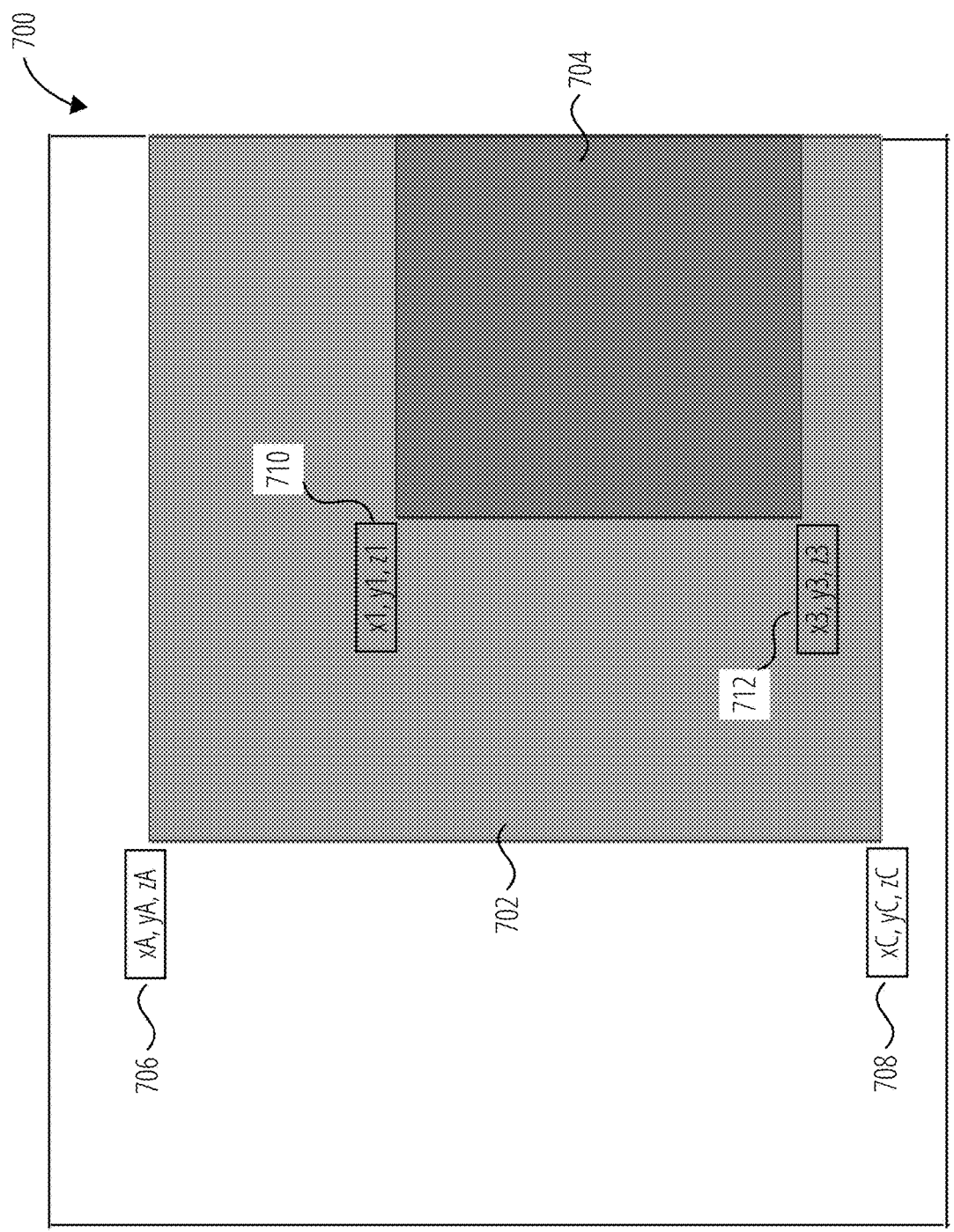
FIG. 7 illustrates a method of partial virtual image generation 700 in accordance with one embodiment.

The information passed to the printer through the printer image processing pipeline may be in the form of percentages, so that the mobile app does not need to know the actual dimensions or resolution of the image in the printer. Because only part of the virtual image overlay is visible at this zoom level and orientation as shown in FIG. 7, the coordinates passed to the printer will be:
- Upper Left: 0%, 0%
- Upper right: 25, 0%
- Lower Left: 0%, 100%
- Lower right: 25, 100%

The resolution request passed to the printer will be the length (in pixels of the mobile device display) of the longest visible dimension of the virtual image overlay, which in this embodiment is the line segment between points 1a and 3a.

Figure 8:
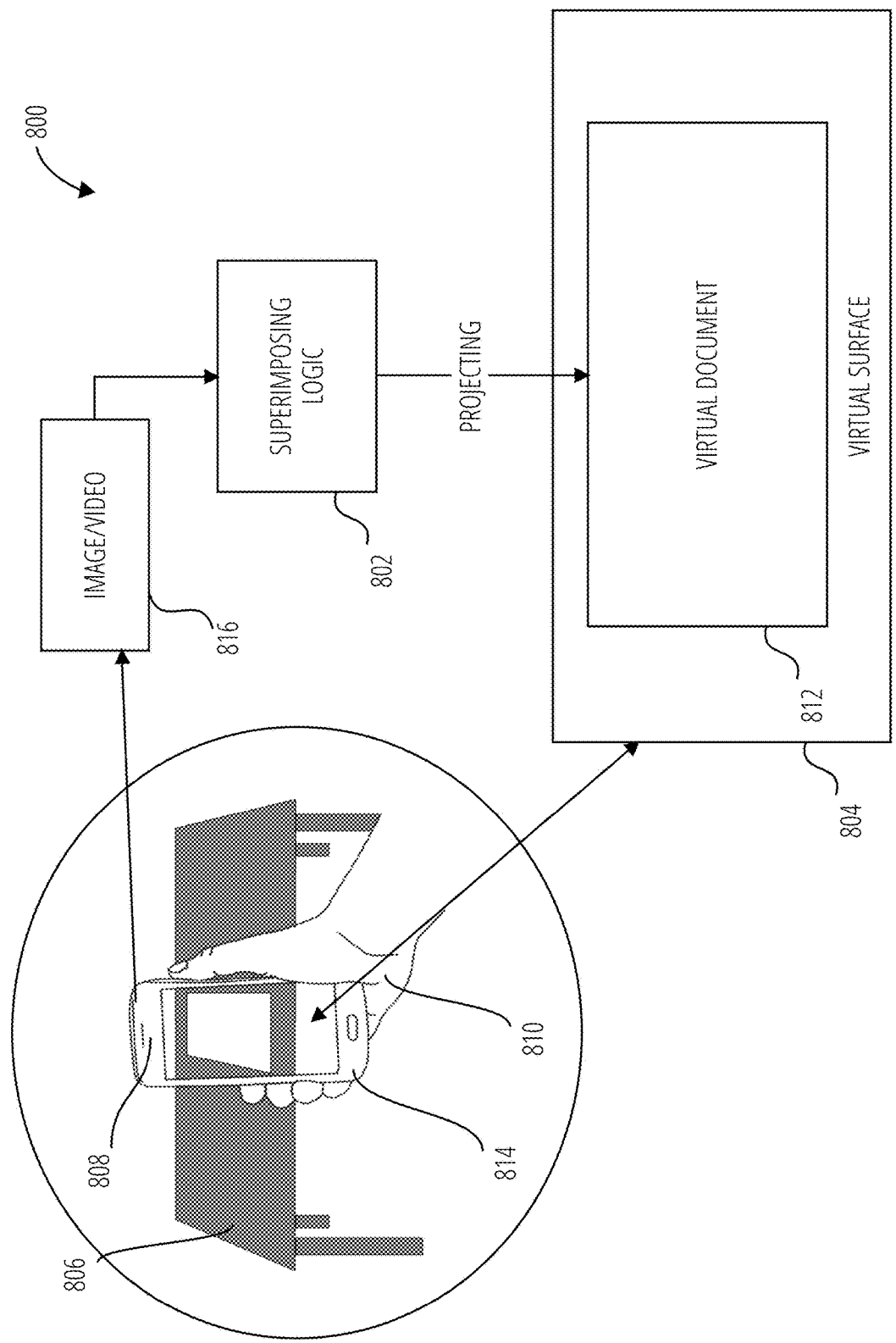
FIG. 8 illustrates an embodiment of an augmented reality environment 800.

FIG. 8 illustrates an embodiment of an augmented reality environment 800. A user 810 holding a mobile device 814 interacts with physical objects virtualized in the augmented reality environment 800. In this example the user 810 interacts with either a purely virtual document, or a physical document that is virtualized as a virtual document 812 on a virtual surface 804 in the augmented reality environment 800. In this embodiment, an imaging sensor 808 is directed toward a physical surface 806, and superimposing logic 802 receives a sensor output 816 (e.g., image or video) from the imaging sensor 808. Superimposing logic 802 transforms the sensor output 816 into a virtual document 812 superimposed on a virtual surface 804 representing the physical surface 806 in the augmented reality environment 800.

In other embodiments there may be no physical surface 806 and no physical document on the physical surface 806, in which case the environment would be a purely virtual reality (VR) environment, not an augmented reality environment 800. Thus there are many possibilities for the environment—it could be purely virtual, or a physical surface 806 that is virtualized and augmented with a virtual document, or both the physical surface 806 and a physical document could be virtualized.

Figure 9:
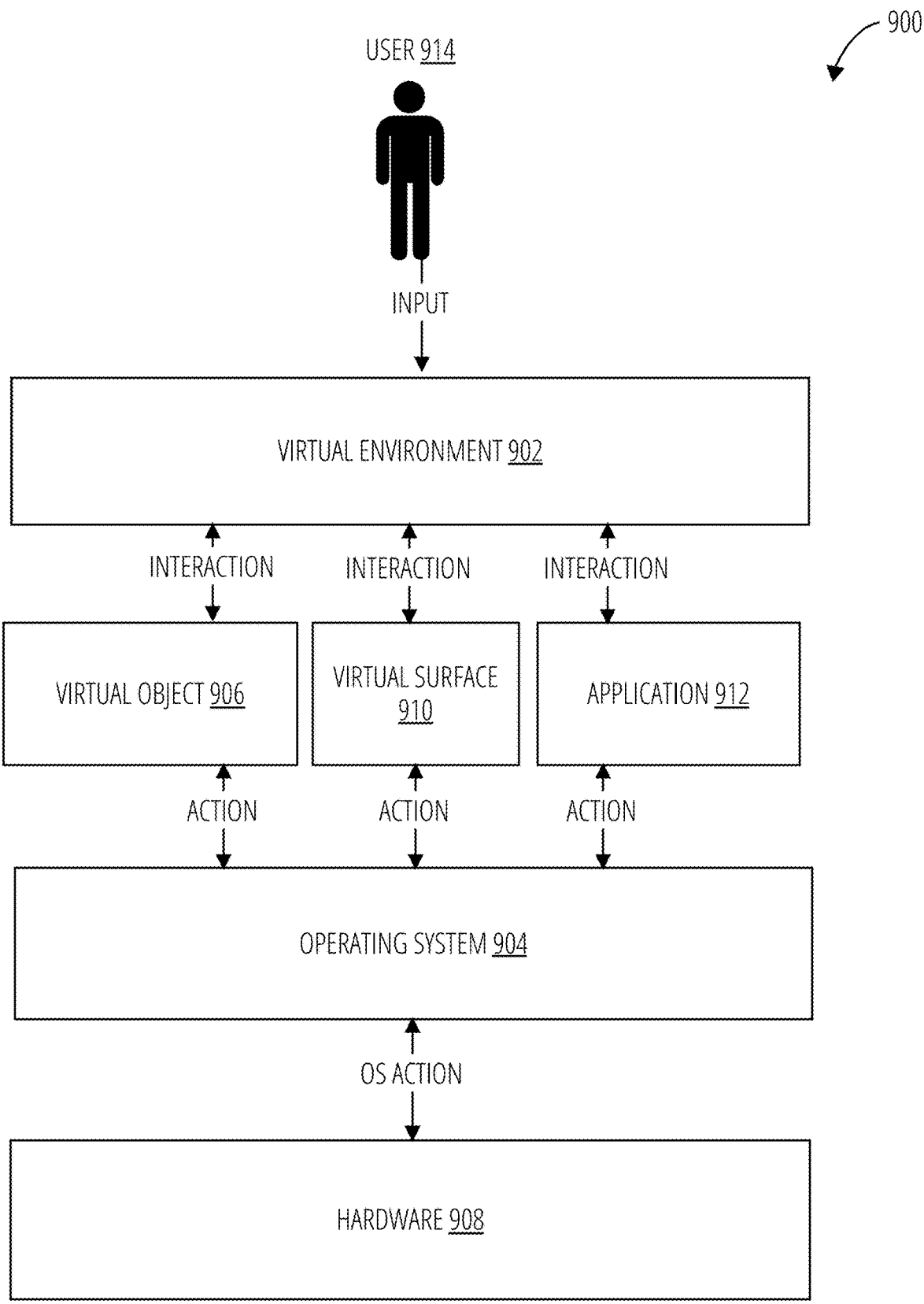
FIG. 9 illustrates an AR or VR system 900 in accordance with one embodiment.

FIG. 9 illustrates an AR or VR system 900 in accordance with one embodiment. A virtual environment 902 receives input from the user 914 and in response sends an interaction signal to a virtual object 906, a virtual surface 910 or an application 912. The virtual object 906 or virtual surface 910 or application 912 sends an action to an operating system 904 and in response the operating system 904 operates the hardware 908 to implement the action in the augmented or virtual environment.

Figure 10:
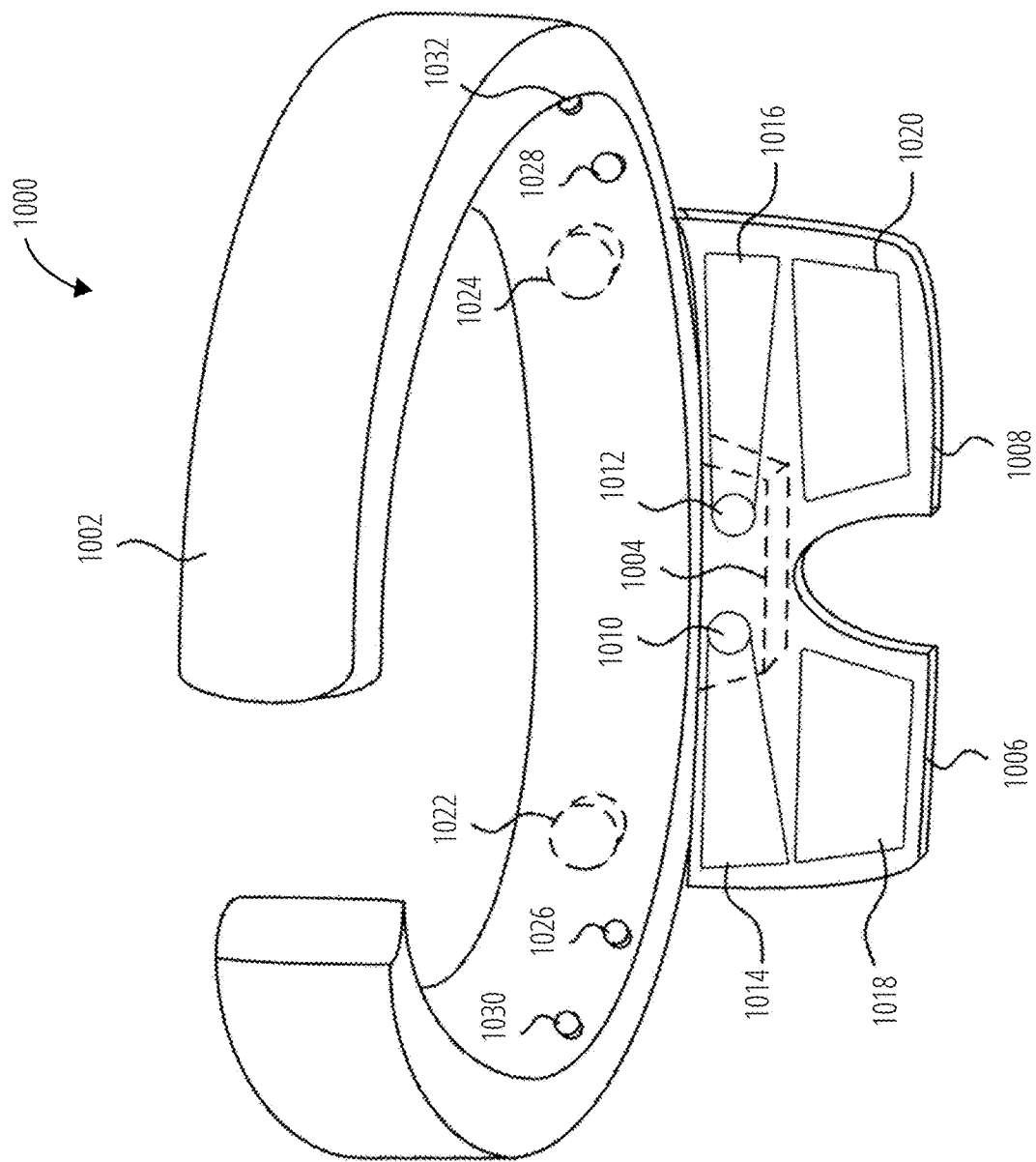
FIG. 10 illustrates a device 1000 in accordance with one embodiment.

FIG. 10 illustrates a perspective view of a wearable augmented reality ("AR") device (device 1000), from the perspective of a wearer of the device 1000 ("AR user"). The device 1000 is a computer device in the form of a wearable headset.

The device 1000 comprises a headpiece 1002, which is a headband, arranged to be worn on the wearer's head. The headpiece 1002 has a central portion 1004 intended to fit over the nose bridge of a wearer, and has an inner curvature intended to wrap around the wearer's head above their ears.

Figure 11:
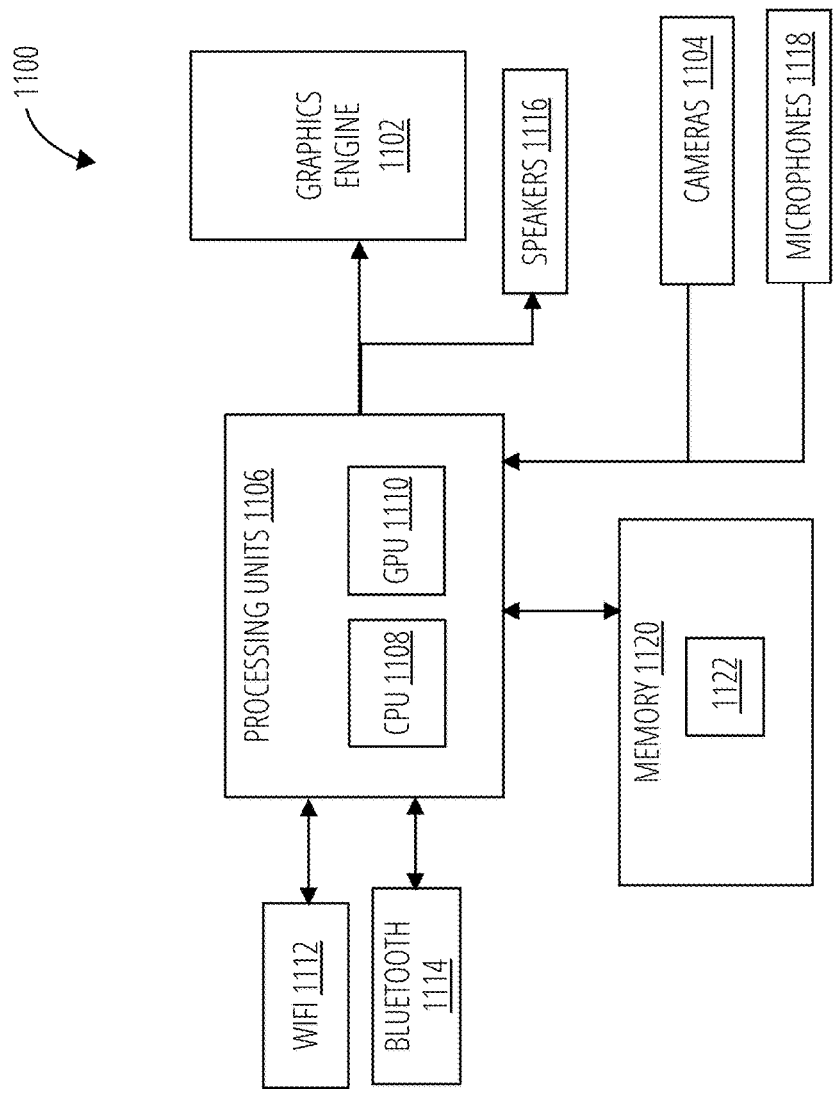
FIG. 11 illustrates an augmented reality device logic 1100 in accordance with one embodiment.

The headpiece 1002 supports a left optical component 1006 and a right optical component 1008, which are waveguides. For ease of reference herein an optical component will be considered to be either a left or right component, because in the described embodiment the components are essentially identical apart from being mirror images of each other. Therefore, all description pertaining to the left-hand component also pertains to the right-hand component. The device 1000 comprises augmented reality device logic 1100 that is depicted in FIG. 11.

The augmented reality device logic 1100 comprises a graphics engine 1102, which may comprise a micro display and imaging optics in the form of a collimating lens (not shown). The micro display can be any type of image source, such as liquid crystal on silicon (LCOS) displays, transmissive liquid crystal displays (LCD), matrix arrays of LED's (whether organic or inorganic) and any other suitable display. The display is driven by circuitry known in the art to activate individual pixels of the display to generate an image. Substantially collimated light, from each pixel, falls on an exit pupil of the graphics engine 1102. At the exit pupil, the collimated light beams are coupled into each of the left optical component 1006 and the right optical component 1008 into a respective left in-coupling zone 1010 and right in-coupling zone 1012. In-coupled light is then guided, through a mechanism that involves diffraction and TIR, laterally of the optical component in a respective left intermediate zone 1014 and 416, and also downward into a respective left exit zone 1018 and right exit zone 1020 where it exits towards the users' eye.

The collimating lens collimates the image into a plurality of beams, which form a virtual version of the displayed image, the virtual version being a virtual image at infinity in the optics sense. The light exits as a plurality of beams, corresponding to the input beams and forming substantially the same virtual image, which the lens of the eye projects onto the retina to form a real image visible to the user. In this manner, the left optical component 1006 and the right optical component 1008 project the displayed image onto the wearer's eyes.

The various optical zones can, for example, be suitably arranged diffractions gratings or holograms. Each optical component has a refractive index n which is such that total internal reflection takes place to guide the beam from the light engine along the respective intermediate expansion zone, and down towards respective the exit zone.

Each optical component is substantially transparent, whereby the wearer can see through it to view a real-world environment in which they are located simultaneously with the projected image, thereby providing an augmented reality experience.

To provide a stereoscopic image, i.e. that is perceived as having 3D structure by the user, slightly different versions of a 2D image can be projected onto each eye for example from multiple graphics engine 1102 (i.e. two micro displays), or from the same light engine (i.e. one micro display) using suitable optics to split the light output from the single display.

The device 1000 is just one exemplary configuration. For instance, where two light-engines are used, these may instead be at separate locations to the right and left of the device (near the wearer's ears). Moreover, whilst in this example, the input beams that form the virtual image are generated by collimating light from the display, an alternative light engine based on so-called scanning can replicate this effect with a single beam, the orientation of which is fast modulated whilst simultaneously modulating its intensity and/or color. A virtual image can be simulated in this manner that is equivalent to a virtual image that would be created by collimating light of a (real) image on a display with collimating optics. Alternatively, a similar AR experience can be provided by embedding substantially transparent pixels in a glass or polymer plate in front of the wearer's eyes, having a similar configuration to the left optical component 1006 and right optical component 1008 though without the need for the zone structures.

Other headpiece 1002 embodiments are also within the scope of the subject matter. For instance, the display optics can equally be attached to the user's head using a frame (in the manner of conventional spectacles), helmet or other fit system. The purpose of the fit system is to support the display and provide stability to the display and other head borne systems such as tracking systems and cameras. The fit system can be designed to meet user population in anthropometric range and head morphology and provide comfortable support of the display system.

The device 1000 also comprises one or more camera 1104—for example left stereo camera 1022 and right stereo camera 1024 mounted on the headpiece 1002 and configured to capture an approximate view ("field of view") from the user's left and right eyes respectfully in this example. The cameras are located towards either side of the user's head on the headpiece 1002, and thus capture images of the scene forward of the device from slightly different perspectives. In combination, the stereo camera's capture a stereoscopic moving image of the real-world environment as the device moves through it. A stereoscopic moving image means two moving images showing slightly different perspectives of the same scene, each formed of a temporal sequence of frames to be played out in quick succession to replicate movement. When combined, the two images give the impression of moving 3D structure.

A left microphone 1026 and a right microphone 1028 are located at the front of the headpiece (from the perspective of the wearer), and left and right channel speakers, earpiece or other audio output transducers are to the left and right of the headpiece 1002. These are in the form of a pair of bone conduction audio transducers functioning as a left speaker 1030 and right speaker 1032 audio channel output.

FIG. 11 illustrates components of an exemplary augmented reality device logic 1100. The augmented reality device logic 1100 comprises a graphics engine 1102, a camera 1104, processing units 1106, including one or more CPU 1108 and/or GPU 1110, a WiFi 1112 wireless interface, a Bluetooth 1114 wireless interface, speakers 1116, microphones 1118, and one or more memory 1120.

The processing units 1106 may in some cases comprise programmable devices such as bespoke processing units optimized for a particular function, such as AR related functions. The augmented reality device logic 1100 may comprise other components that are not shown, such as dedicated depth sensors, additional interfaces etc.

Some or all of the components in FIG. 11 may be housed in an AR headset or a mobile device such as a smartphone. In some embodiments, some of these components may be housed in a separate housing connected or in wireless communication with the components of the AR headset or mobile device. For example, a separate housing for some components may be designed to be worn or a belt or to fit in the wearer's pocket, or one or more of the components may be housed in a separate computer device (smartphone, tablet, laptop or desktop computer etc.) which communicates wirelessly with the display and camera apparatus in the AR headset, whereby the headset and separate device constitute the full augmented reality device logic 1100.

The memory 1120 comprises logic 1122 to be applied to the processing units 1106 to execute. In some cases, different parts of the logic 1122 may be executed by different components of the processing units 1106. The logic 1122 typically comprises code of an operating system, as well as code of one or more applications configured to run on the operating system to carry out aspects of the processes disclosed herein.

Figure 12:
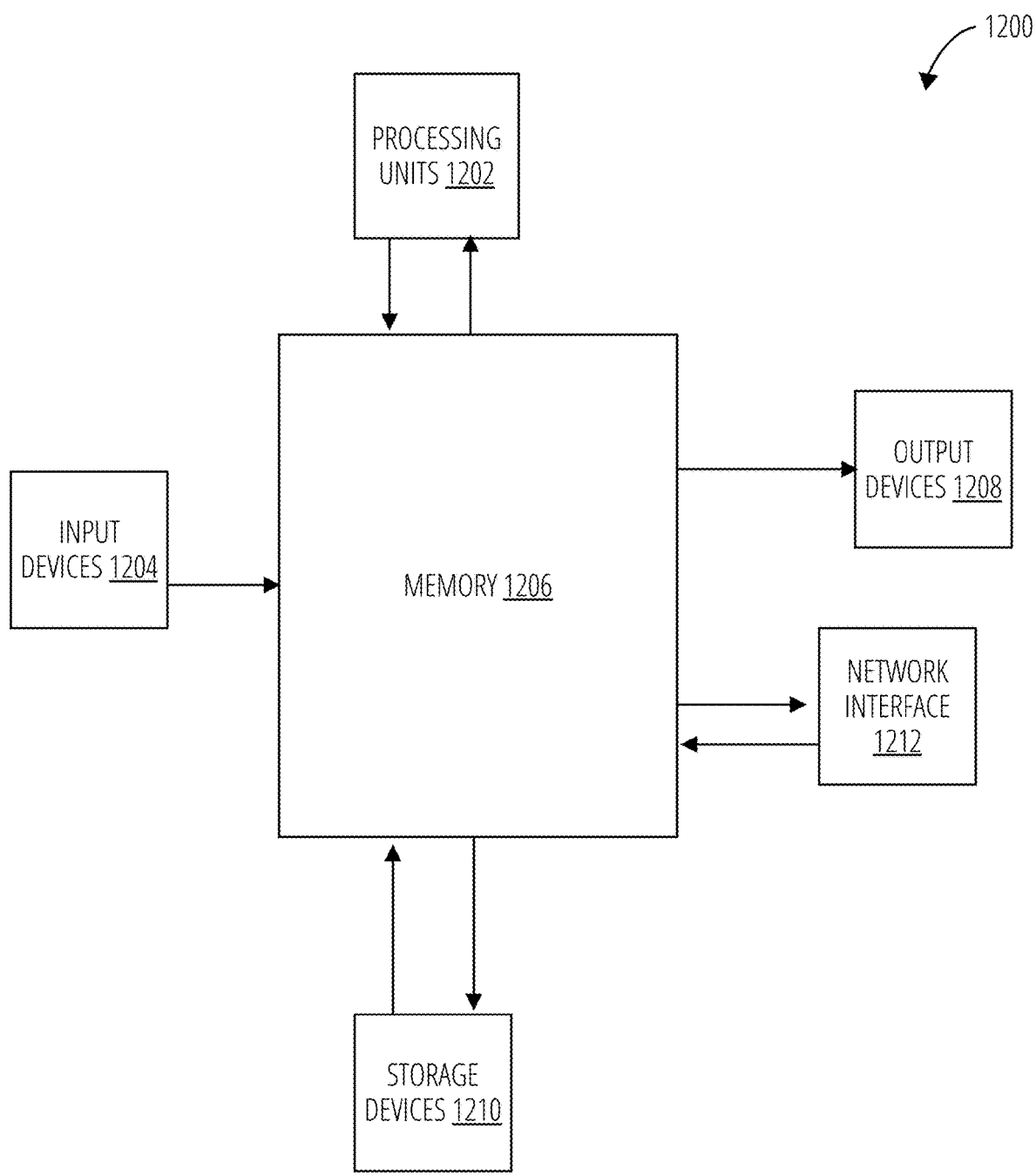
FIG. 12 illustrates an AR device 1200 that may implement aspects of the machine processes described herein.

FIG. 12 illustrates more aspects of an AR device 1200 according to one embodiment. The AR device 1200 comprises processing units 1202, input devices 1204, memory 1206, output devices 1208, storage devices 1210, a network interface 1212, and various logic to carry out the processes disclosed herein.

The input devices 1204 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 1204 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 1204 are provided via various machine signal conductors (e.g., busses or network interfaces) and circuits to memory 1206.

The memory 1206 provides for storage (via configuration of matter or states of matter) of signals received from the input devices 1204, instructions and information for controlling operation of the processing units 1202, and signals from storage devices 1210. The memory 1206 may in fact comprise multiple memory devices of different types, for example random access memory devices and non-volatile (e.g., FLASH memory) devices.

Information stored in the memory 1206 is typically directly accessible to the processing units 1202 of the device. Signals input to the AR device 1200 cause the reconfiguration of the internal material/energy state of the memory 1206, creating logic that in essence forms a new machine configuration, influencing the behavior of the AR device 1200 by affecting the behavior of the processing units 1202 with control signals (instructions) and data provided in conjunction with the control signals.

The storage devices 1210 may provide a slower but higher capacity machine memory capability. Examples of storage devices 1210 are hard disks, optical disks, large capacity flash memories or other non-volatile memory technologies, and magnetic memories.

The processing units 1202 may cause the configuration of the memory 1206 to be altered by signals in the storage devices 1210. In other words, the processing units 1202 may cause data and instructions to be read from storage devices 1210 in the memory 1206 from which may then influence the operations of processing units 1202 as instructions and data signals, and from which it may also be provided to the output devices 1208. The processing units 1202 may alter the content of the memory 1206 by signaling to a machine interface of memory 1206 to alter the internal configuration, and then converted signals to the storage devices 1210 to alter its material internal configuration. In other words, data and instructions may be backed up from memory 1206, which is often volatile, to storage devices 1210, which are often non-volatile.

Output devices 1208 are transducers which convert signals received from the memory 1206 into physical phenomenon such as vibrations in the air, or patterns of light on a machine display, or vibrations (i.e., haptic devices) or patterns of ink or other materials (i.e., printers and 3-D printers).

The network interface 1212 receives signals from the memory 1206 or processing units 1202 and converts them into electrical, optical, or wireless signals to other machines, typically via a machine network. The network interface 1212 also receives signals from the machine network and converts them into electrical, optical, or wireless signals to the memory 1206 or processing units 1202.

Figure 13:
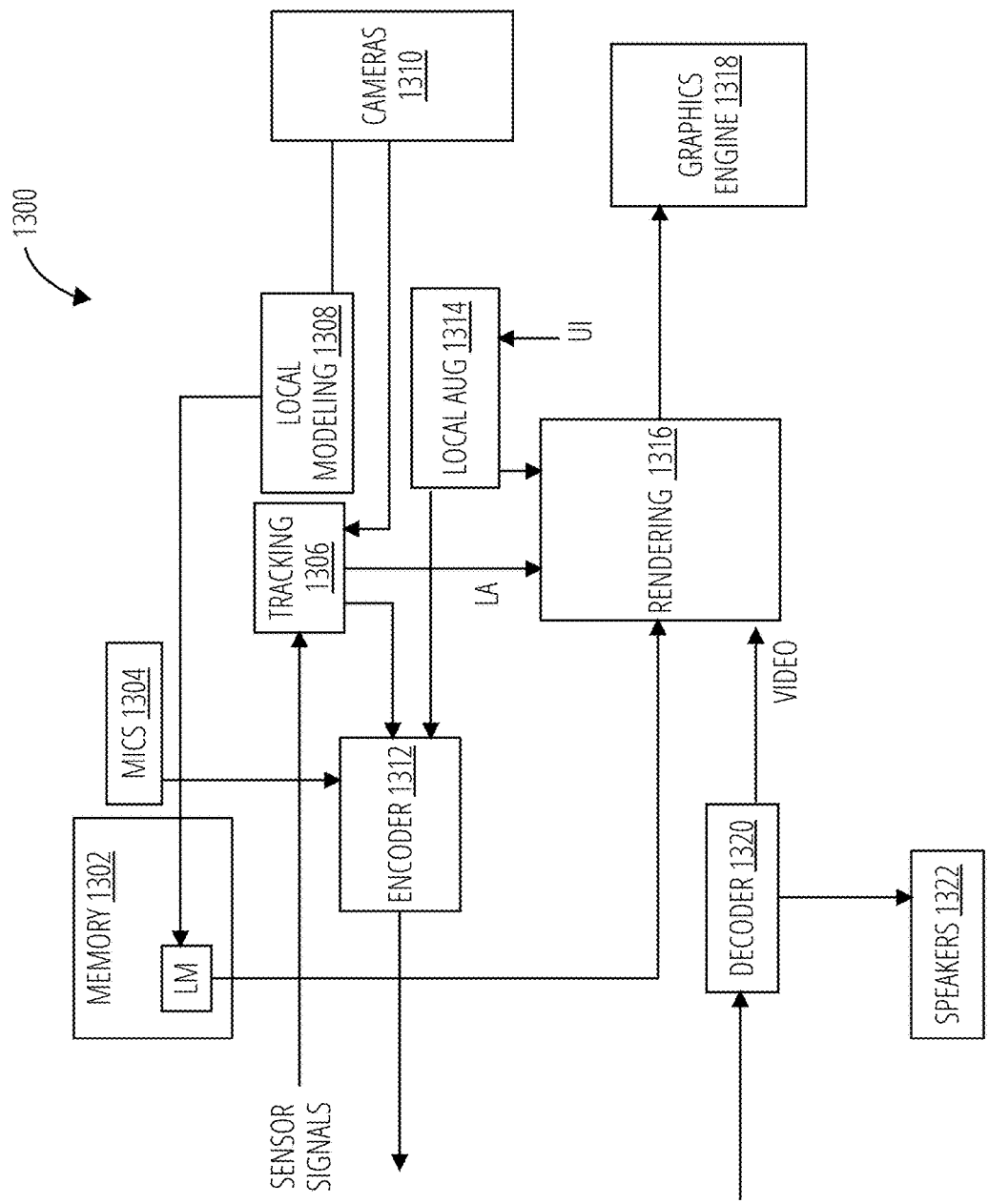
FIG. 13 illustrates an AR device logic 1300 in accordance with one embodiment.

FIG. 13 illustrates a functional block diagram of an embodiment of AR device logic 1300. The AR device logic 1300 comprises the following functional modules: a rendering engine 1316, local augmentation logic 1314, local modeling logic 1308, device tracking logic 1306, an encoder 1312, and a decoder 1320. Each of these functional modules may be implemented in software, dedicated hardware, firmware, or a combination of these logic types.

The rendering engine 1316 controls the graphics engine 1318 to generate a stereoscopic image visible to the wearer, i.e. to generate slightly different images that are projected onto different eyes by the optical components of a headset substantially simultaneously, so as to create the impression of 3D structure.

The stereoscopic image is formed by rendering engine 1316 rendering at least one virtual display element also known as an augmentation, which is perceived as a 3D element, i.e. having perceived 3D structure, at a real-world location in 3D space by the user.

An augmentation may be represented by an augmentation object stored in the memory 1302. The augmentation object comprises: location data defining a desired location in 3D space for the virtual element (e.g. as (x,y,z) Cartesian coordinates); structural data defining 3D surface structure of the virtual element, i.e. a 3D model of the virtual element; and image data defining 2D surface texture of the virtual element to be applied to the surfaces defined by the 3D model. The augmentation object may comprise additional information, such as a desired orientation of the augmentation. Examples of desired orientations may include portrait or landscape orientations.

The perceived 3D effects are achieved through suitable rendering of the augmentation object. To give the impression of the augmentation having 3D structure, a stereoscopic image is generated based on the 2D surface and 3D augmentation model data in the data object, with the augmentation being rendered to appear at the desired location in the stereoscopic image.

The 3D model represents a structure present in the real world, and the information it provides about this structure allows an augmentation object to be displayed as though it were a real-world 3D object, thereby providing an immersive augmented reality experience. The 3D model may be in the form of 3D mesh. A 3D mesh is a structural build of a 3D model consisting of polygons. 3D meshes use reference points in X, Y and Z axes to define shapes with height, width, and depth.

For example, based on the model of the real-world, an impression can be given of the augmentation being obscured by a real-world object that is in front of its perceived location from the perspective of the user; dynamically interacting with a real-world object, e.g. by moving around the object; statically interacting with a real-world object, say by sitting on top of it etc.

Whether or not real-world structure should affect an augmentation can be determined based on suitable rendering criteria. For example, by creating a 3D model of the perceived AR world, which includes the real-world surface structure and any augmentations, and projecting it onto a plane along the AR user's line of sight as determined using pose tracking including the use of pose vectors (see below), a suitable criteria for determining whether a real-world object should be perceived as partially obscuring an augmentation is whether the projection of the real-world object in the plane overlaps with the projection of the augmentation, which could be further refined to account for transparent or opaque real world structures. Generally the criteria can depend on the location and/or orientation of the augmented reality device and/or the real-world structure in question.

An augmentation can also be mapped to the mesh, in the sense that its desired location and/or orientation is defined relative to a certain structure(s) in the mesh. Should that structure move and/or rotate causing a corresponding change in the mesh, when rendered properly this will cause corresponding change in the location and/or orientation of the augmentation. For example, the desired location of an augmentation may be on, and defined relative to, a tabletop structure; should the table be moved, the augmentation moves with it. Object recognition can be used to this end, for example to recognize a known shape of table and thereby detect when the table has moved using its recognizable structure. Such object recognition techniques are known in the art.

An augmentation that is mapped to the mesh in this manner, or is otherwise associated with a particular piece of surface structure embodied in a 3D model, is referred to an "annotation" to that piece of surface structure. In order to annotate a piece of real-world surface structure, it is necessary to have that surface structure represented by the 3D model in question—without this, the real-world structure cannot be annotated.

The local modeling logic 1308 generates a local 3D model "LM" of the environment in the memory 1302, using the AR device's own sensor(s) e.g. cameras 1310 and/or any dedicated depth sensors etc.

The device tracking logic 1306 tracks the location and orientation of the AR device, e.g. a headset, using local sensor readings captured from the AR device. The sensor readings can be captured in a number of ways, for example using the cameras 1310 and/or other sensor(s) such as accelerometers. The device tracking logic 1306 determines the current location and orientation of the AR device and provides this information to the rendering engine 1316, for example by outputting a current "pose vector" of the AR device. The pose vector is a six dimensional vector, for example (x, y, z, P, R, Y) where (x,y,z) are the device's Cartesian coordinates with respect to a suitable origin, and (P, R, Y) are the device's pitch, roll and yaw with respect to suitable reference axes.

The rendering engine 1316 adapts the local model based on the tracking, to account for the movement of the device i.e. to maintain the perception of the 3D elements occupying the real-world, for example to ensure that static augmentations appear to remain static (which will in fact be achieved by scaling or rotating them as, from the AR user's perspective, the environment is moving relative to them).

The encoder 1312 receives image data from the cameras 1310 and audio data from the microphones 1304 and possibly other types of data (e.g., annotation or text generated by the user of the AR device using the local augmentation logic 1314 that receives data from a user interface "UI") and transmits that information to other devices, for example the devices of collaborators in the AR environment. The decoder 1320 receives an incoming data stream from other devices, and extracts audio, video, and possibly other types of data (e.g., annotations, text) therefrom.

Implementations

Terms used herein should be accorded their ordinary meaning in the relevant arts, or the meaning indicated by their use in context, but if an express definition is provided, that meaning controls.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator." Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

What is claimed is:

1. A method of generating an Augmented Reality (AR) display environment, comprising:
    establishing a data connection at a mobile device, wherein the data connection connects to a printer image processing pipeline comprising printer image data, and the mobile device comprises an imaging sensor and a display;
    receiving the printer image data on the mobile device from the printer image processing pipeline, wherein the printer image data comprises pixels;
    generating an augmentation object of a virtual image based on the received printer image data, comprising:
        calculating two-dimensional (2D) coordinates for the four corners of the virtual image, wherein the virtual image is rectangular in shape and includes four corners, comprising:
            determining the distance between each corner of the virtual image to an adjacent corner of the virtual image, wherein the distance is the visible dimension in pixels of the display of the mobile device used to display the virtual image;
            calculating apparent 2D coordinates of each corner of the virtual image, wherein the apparent 2D coordinates are percentages relative to the longest visible dimension of the virtual image in the AR display environment on the display; and
            calculating a pixel resolution from the apparent 2D coordinates, wherein the pixel resolution includes the apparent 2D coordinates of each corner of the virtual image;
    receiving live video data of the physical environment from the imaging sensor on the mobile device, wherein the physical environment includes physical objects with detectable features, and the content of the live video data collected by the imaging sensor is at least partially directed by a user input;
    generating a local three-dimensional (3D) model of the physical environment utilizing the live video data;
    receiving mobile device tracking data from the mobile device;
    adapting the local 3D model based on the mobile device tracking data, thereby creating an adapted local 3D model;
    combining the augmentation object with the adapted local 3D model to create the AR display environment; and
    configuring the mobile device to display the AR display environment.

2. The method of claim 1, wherein the augmentation object comprises at least one of location data defining a desired location in 3D space of the virtual image, structural data defining the 3D surface structure of the virtual image, image data defining the 2D surface texture of the virtual image to be applied to the surfaces defined by the local 3D model, and combinations thereof.

3. The method of claim 1, wherein the tracking data comprises data from at least one of a camera, an accelerometer, a compass, a proximity sensor, a motion sensor, RF receivers, a light sensor, a positioning system, and combinations thereof.

4. The method of claim 1, wherein the mobile device is at least one of a mobile phone, a tablet, an AR headset, and combinations thereof.

5. The method of claim 1, wherein the user input includes at least one of directing the imaging sensor to a portion of the physical environment, moving the imaging sensor closer to or further from the physical objects in the physical environment, selecting a portion of the virtual image data in the AR display environment to display, and combinations thereof.

6. The method of claim 1, wherein the generating of the local 3D model of the physical environment utilizing the live video data comprises assigning tracking anchor points to the live video data based on the detection of features of the physical objects in the physical environment and establishing an initial reference frame based on the user input.

7. The method of claim 6, further comprising:
    receiving additional live video data of the physical environment from the imaging sensor on the mobile device; and
    updating the local 3D model of the physical environment utilizing the additional live video data, including updating the assigned tracking anchor points based on the additional live video data.

8. The method of claim 1, wherein the printer image processing pipeline comprises a cloud server, wherein the cloud server performs at least one of the following: receiving image data from the printer image processing pipeline, transmitting image data from the printer image processing pipeline, generating the local 3D model of the physical environment, receiving the mobile device tracking data from the mobile device, adapting the local 3D model based on the mobile device tracking data, thereby creating the adapted local 3D model, combining the augmentation object with the adapted local 3D model to create the AR display environment, configuring the mobile device to display the AR display environment, and combinations thereof.

9. The method of claim 1, further comprising:
    receiving additional live video data of the physical environment from the imaging sensor on the mobile device;
    updating the local 3D model of the physical environment utilizing the additional live video data;
    receiving updated mobile device tracking data from the mobile device;
    adapting the updated local 3D model based on the updated mobile device tracking data, thereby creating an updated adapted local 3D model;
    combining the augmentation object with the updated adapted local 3D model to create an updated AR display environment; and configuring the mobile device to display the updated AR display environment.

10. The method of claim 1, further comprising:
selecting a rectangular part of the virtual image, wherein the rectangular part is determined by the user input; and
calculating 2D coordinates for the four corners of the rectangular part of the virtual image, comprising:
determining the distance between each corner of the rectangular part of the virtual image to an adjacent corner of the full virtual image, wherein the distance is the visible dimension in pixels of the display of the mobile device used to display the virtual image;
calculating apparent 2D coordinates of each corner of the rectangular part of the virtual image, wherein the apparent 2D coordinates of the rectangular part are percentages relative to the longest visible dimension of the full virtual image in the AR display environment on the display; and
calculating a pixel resolution for the rectangular part of the virtual image from the apparent 2D coordinates for the rectangular part, wherein the pixel resolution for the rectangular part includes the apparent 2D coordinates of each corner of the rectangular part of the virtual image.

11. The method of claim 1, further comprising:
transmitting the pixel resolution to the printer image processing pipeline;
receiving pixel image data for the pixel resolution from the printer image processing pipeline;
generating a modified augmentation object of the virtual image based on the received pixel image data from the printer image processing pipeline;
combining the modified augmentation object with the adapted local 3D model to create an updated AR display environment; and
configuring the mobile device to display the updated AR display environment.

12. A system, comprising:
a processor;
an imaging sensor;
a display; and
a memory storing instructions that, when executed by the processor, configure the system to:
establish a data connection at a mobile device, wherein the data connection connects to a printer image processing pipeline comprising printer image data;
receive printer image data on the mobile device from the printer image processing pipeline, wherein the printer image data comprises pixels;
generate an augmentation object of a virtual image based on the received printer image data, comprising:
calculating two-dimensional (2D) coordinates for the four corners of the virtual image, wherein the virtual image is rectangular in shape and includes four corners, comprising:
determining the distance between each corner of the virtual image to an adjacent corner of the virtual image, wherein the distance is the visible dimension in pixels of the display of the mobile device used to display the virtual image;
calculating apparent 2D coordinates of each corner of the virtual image, wherein the apparent 2D coordinates are percentages relative to the longest visible dimension of the virtual image in the AR display environment on the display; and
calculating a pixel resolution from the apparent 2D coordinates, wherein the pixel resolution includes the apparent 2D coordinates of each corner of the virtual image;
receive live video data of the physical environment from the imaging sensor on the mobile device, wherein the physical environment includes physical objects with detectable features, and the content of the live video data collected by the imaging sensor is at least partially directed by a user input;
generate a local three-dimensional (3D) model of the physical environment utilizing the live video data;
receive mobile device tracking data from the mobile device;
adapt the local 3D model based on the mobile device tracking data, thereby creating an adapted local 3D model;
combine the augmentation object with the adapted local 3D model to create an AR environment; and
configure the mobile device to display the AR environment.

13. The system of claim 12, wherein local modeling logic is used to generate the local 3D model.

14. The system of claim 12, wherein local augmentation logic is used to generate the augmentation object.

15. The system of claim 12, wherein device tracking logic is used to adapt the local 3D model based on the mobile device tracking data.

16. The system of claim 12, wherein a rendering engine is used to combine the augmentation object with the adapted local 3D model to create the AR environment.

17. The system of claim 12, wherein the printer image processing pipeline comprises a cloud server, wherein the cloud server performs at least one of the following: receiving image data from the printer image processing pipeline, transmitting image data from the printer image processing pipeline, generating the local 3D model of the physical environment, receiving the mobile device tracking data from the mobile device, adapting the local 3D model based on the mobile device tracking data, thereby creating the adapted local 3D model, combining the augmentation object with the adapted local 3D model to create the AR environment, configuring the mobile device to display the AR environment, and combinations thereof.

18. The system of claim 12, further comprising:
configuring the mobile device to:
receive additional live video data of the physical environment from an imaging sensor on the mobile device;
update the local 3D model of the physical environment utilizing the additional live video data;
receive updated mobile device tracking data from the mobile device;
adapt the updated local 3D model based on the updated mobile device tracking data, thereby creating an updated adapted local 3D model;
combine the augmentation object with the updated adapted local 3D model to create an updated AR environment; and
configure the mobile device to display the updated AR environment.

* * * * *